(12) United States Patent
Hong et al.

(10) Patent No.: US 10,740,291 B2
(45) Date of Patent: Aug. 11, 2020

(54) METHOD FOR TRANSMITTING REQUESTED CONTENT ACCORDING TO HASH VALUE OF CONTENT IN A CONTENT-BASED NETWORK

(71) Applicant: UNIVERSITY-INDUSTRY COOPERATION GROUP OF KYUNG HEE UNIVERSITY, Yongin (KR)

(72) Inventors: Choong Seon Hong, Yongin (KR); Thar Kyi, Yongin (KR)

(73) Assignee: UNIVERSITY-INDUSTRY COOPERATION GROUP OF KYUNG HEE UNIVERSITY, Yongin (KR)

( * ) Notice: Subject to any disclaimer, the term of this patent is extended or adjusted under 35 U.S.C. 154(b) by 479 days.

(21) Appl. No.: 15/537,375

(22) PCT Filed: Feb. 12, 2015

(86) PCT No.: PCT/KR2015/001435
§ 371 (c)(1),
(2) Date: Jun. 16, 2017

(87) PCT Pub. No.: WO2016/098944
PCT Pub. Date: Jun. 23, 2016

(65) Prior Publication Data
US 2017/0329794 A1 Nov. 16, 2017

(30) Foreign Application Priority Data
Dec. 17, 2014 (KR) .................. 10-2014-0182720

(51) Int. Cl.
*G06F 16/00* (2019.01)
*G06F 16/14* (2019.01)
(Continued)

(52) U.S. Cl.
CPC ............ *G06F 16/152* (2019.01); *H04L 12/28* (2013.01); *H04L 67/1014* (2013.01);
(Continued)

(58) Field of Classification Search
CPC ... G06F 16/152; H04L 12/28; H04L 67/1014; H04L 67/327; H04L 41/0893; H04L 67/2842; H04L 41/02; H04L 41/00
See application file for complete search history.

(56) References Cited

U.S. PATENT DOCUMENTS

| 2013/0024996 A1 | 1/2013 | Kelly |
| 2015/0201033 A1* | 7/2015 | Gupta ................ H04L 67/2842 709/213 |

(Continued)

FOREIGN PATENT DOCUMENTS

| JP | 2009-187101 A | 8/2009 |
| JP | 2010-238160 A | 10/2010 |

(Continued)

OTHER PUBLICATIONS

International Search Report for International Patent Application No. PCT/KR2015/001435 filed on Feb. 12, 2015.

*Primary Examiner* — Alexander Khong

(57) ABSTRACT

The present invention relates to a method for transmitting content in a content-based network and, more particularly, to a content transmission method by which requested content is identified on the basis of a hash value of the requested content so as to be stored only in mapped routers, thereby preventing the same content from being duplicately stored in routers in a regional group such that various types of content can be distributed and stored, and a content request message is directly transmitted only to routers mapped to a hash value of requested content, on the basis of the hash value of the requested content, such that a traffic load, occurring due to the transmission of a content request message by a flooding scheme, can be reduced.

16 Claims, 10 Drawing Sheets

(51) Int. Cl.
*H04L 29/08* (2006.01)
*H04L 12/28* (2006.01)
*H04L 12/24* (2006.01)

(52) U.S. Cl.
CPC ........ H04L 67/327 (2013.01); *H04L 41/0893* (2013.01); *H04L 67/2842* (2013.01)

(56) References Cited

U.S. PATENT DOCUMENTS

| | | | |
|---|---|---|---|
| 2015/0237159 A1* | 8/2015 | Lawrence | H04L 67/2814 709/213 |
| 2015/0280918 A1* | 10/2015 | Uzun | H04L 9/3236 713/176 |
| 2016/0149810 A1* | 5/2016 | Liu | H04L 45/12 370/392 |
| 2016/0191631 A1* | 6/2016 | Haraszti | H04L 67/14 709/227 |
| 2017/0142226 A1* | 5/2017 | De Foy | H04L 45/7453 |

FOREIGN PATENT DOCUMENTS

| | | |
|---|---|---|
| JP | 2012-078903 A | 4/2012 |
| KR | 10-2012-0110871 A | 10/2012 |
| KR | 10-2013-0016594 A | 2/2013 |
| KR | 10-2013-0048032 A | 5/2013 |

* cited by examiner

FIG. 6

| router 1 (200GB) | | router 2 (300GB) | | | router 3 (400GB) | | | router 4 (500GB) | | | |
|---|---|---|---|---|---|---|---|---|---|---|---|
| 1 | 5 | 2 | 7 | 9 | 3 | 6 | 10 | 13 | 4 | 8 | 11 | 12 | 14 |

METHOD FOR TRANSMITTING REQUESTED CONTENT ACCORDING TO HASH VALUE OF CONTENT IN A CONTENT-BASED NETWORK

CROSS-REFERENCE TO RELATED APPLICATIONS

This application is one of the results of Development project for knowledge service and industry core technologies (Project No. 1415146278 (2017.06.01-2018.05.31), Project Name: Development of core technologies for mining minds using personal big data) hosted by Ministry Of Trade, Industry and Energy (MOTIE) and Korea Evaluation Institute of Industrial Technology (KEIT) in Republic of Korea.

TECHNICAL FIELD

The present disclosure relates to a method for transmitting contents in a content-based network system. More particularly, the present disclosure relates to a method for transmitting contents in a content-based network system wherein requested contents are assigned different hash values, and a local router mapped to a requested content is identified based on a hash value thereof, and the requested content is stored only in the mapping local router, thereby to ensures that the same contents are not redundantly stored on local routers in a local group, and various kinds of contents are distributed and stored among and in the local routers, and wherein a content request message corresponding to the requested content is sent only to the mapping local router, such that traffic load may be reduced compared to when the content request message is transmitted in a flooded manner.

BACKGROUND ART

In the widely used Internet, service is requested and provided in a one-to-one relationship between a sender and a receiver using an IP address. However, various fields and applications using the Internet such as Internet high-definition TV, Internet voice/picture communication, Internet remote control, Internet of Things (IoT) have been continuously developed and used. Accordingly, service request and provision in this one-to-one relationship have limitations in terms of scalability, security, and service quality due to limitations in the number of IP addresses.

In order to overcome these limitations, researches on the future Internet are underway. The researches are largely divided into an evolutionary approach and a revolutionary approach. In the evolutionary approach, the current basic characteristics of the Internet are maintained and service continuity is ensured. On the other hand, the revolutionary approach creates new network technologies that are not bound or bound to current Internet technologies, and that can fully meet the needs of future societies.

Among the above revolutionary approaches, a content centric network system (CCN) requests and provides a service based on a content name instead of requesting and providing a service in a 1:1 relationship using the conventional IP address.

FIG. 1 is a diagram for illustrating a conventional content centric network system. FIG. 2 and FIG. 3 are diagrams for illustrating a process of transmitting and receiving contents in a conventional content centric network system.

Referring to FIG. 1, the conventional content centric network system includes a network 20 including a plurality of local routers, and a user device 10 and a content server 30 connected to the network 20.

The user device 10 is connected to one of the plurality of local routers included in the network 20 and transmits the content request message to the connected local router. The connected local router extracts an identifier for the requested content from the content request message and determines whether the requested content is stored and registered in the connected local router based on the requested content identifier. If the requested content does not exist in the connected local router, the connected local router transmits the content request message in a flooded manner to neighboring local routers included in the network 20. Next, a neighboring local router storing and registering the requested content therein among the neighboring local routers, or a source local router connected to the content server 30 providing the requested content, transmits the requested content to the user device 10 in the reverse order of the routing flow of the content request message.

Referring to FIG. 2, the user device 10 transmits the content request message CR including information on the requested content to the connected local router A. The connected local router A compares the requested content identifier with the content identifier list stored and registered in the connected local router A, thereby determining whether the requested content exists in the connected local router A. If the requested content does not exist in the connected local router A, the connected local router A transmits the content request message to a neighboring local router B thereto. The neighboring local router B determines whether the requested content exists in the neighboring local router B or not. If the requested content does not exist in the neighboring local router B, the neighboring local router B transmits the content request message to another adjacent neighboring router C thereto. If the requested content is not registered and stored in the neighboring local router C, the neighboring local router C transmits the content request message to another local router D adjacent thereto. The neighboring local router D may be a source local router connected to the content server 30 providing the requested content. In response to the content request message CR, the source local router D transmits a content response message CP including the requested content along a reverse path of the receive path of the content request message CR. That is, the content response message CP is transmitted to the local router C adjacent to the source local router D, then to the neighbor local router B, and then to the connected local router A. each of the local routers B, C, and D located in the transmission path of the content response message CP may register and store the requested content included in the content response message in its own storage unit.

As shown in FIG. 3, when there is a request for the same content from another user device 40, the requested content is not provided to the user device 40 from the server 30 storing the requested content. Instead, the requested content is provided directly to the user device 40 from the neighboring local router C that has stored the requested content. By doing so, the requested content can be provided quickly.

However, in the conventional content-based network system described above, the same content is stored in all the local routers in the routing path between the server providing the content and the user device or between the local router storing the content and the user device. Therefore, the substantially identical contents are redundantly stored in the local routers of the routing paths. As a result, various types of contents cannot be distributed among and stored in the local routers, each router having a limited amount of cache.

Further, since the substantially identical contents are redundantly stored in the local routers of the routing paths, various contents requested from the user device are less likely to be provided directly to the user device. Also, since the local router cannot directly provide the content to the user device, but the content stored in the server is provided to the user device, the traffic load increases.

Since the connected local router transmits the content request message in a flooded manner to the neighboring local routers in the network, it takes a lot of network load to transmit the content request message.

DISCLOSURE

Technical Problem

The present disclosure aims at solving the problems related to the content storage method by the above-mentioned conventional content-based network system. It is an object of the present disclosure to provide a method for transmitting content wherein the same contents are not redundantly stored in local routers constituting the content-based network system, and instead, various kinds of contents can be distributed among and stored in the routers.

It is another object of the present disclosure to provide a method for transmitting content wherein various kinds of contents may be distributed among and stored in the routers, and, thus, the content requested by the user device is directly provided from the local router without going through the server, thereby increasing the probability of providing content.

It is still another object of the present disclosure to provide a method for transmitting content wherein it is possible to reduce the traffic load on the network by transmitting the content request message directly to the mapping local router, which is mapped to the hash value for the requested content.

Technical Solution

In one aspect, there is provided a content-based network system including a plurality of local routers, wherein the system is configured: to assign different hash values to the plurality of local routers; and to store a plurality of contents corresponding to the hash values respectively into the routers.

A content-based network system, wherein the system is configured: to input an identifier for a requested content into a hash function, thereby to compute a hash value for the requested content; to store the requested content in a mapping router which is mapped to the hash value for the requested content; upon receiving a content request message, to identify the mapping router; and to directly transmit the content request message to the identified mapping router.

In one embodiment, the system includes a plurality of local groups, all groups being managed by a single management server, wherein each of the local groups includes a plurality of local routers assigned different hash values respectively.

In one embodiment, the management server includes a virtual controller and a virtual content gateway.

In one embodiment, the hash function is configured to compute the hash values within a range set by identifiers for the requested contents, wherein the different hash values are randomly assigned to the plurality of local routers.

In one embodiment, the number of hash values corresponding to each of the local routers increases in proportion to a storage capacity of each of the local routers.

In another aspect, there is provided a method for transmitting a content in a content-based network system, the method comprising: upon receiving a content request message, inputting an identifier for a requested content contained in the content request message into a hash function, thereby to compute a hash value for the requested content; identifying a mapping local router which is mapped to the computed has value; and directly transmitting the content request message to the identified mapping local router.

In one embodiment, the method further comprises determining whether the mapping local router contains the requested content; and upon determination that whether the mapping local router contains the requested content, transmitting the requested content from the mapping local router to a local router issuing the request message.

In one embodiment, the method further comprises, upon determination that whether the mapping local router does not contain the requested content, transmitting the message form the mapping local router to a management server configured to manage the mapping local router; when the management servers contain the requested content, in response to the content request message, the management servers transmitting the requested content to another local router managed by the same management server; determining whether said another local router is mapped to the hash value for the requested content; upon determination that said another local router is mapped to the hash value, storing the requested content to said another local router; and transmitting the requested content from said local router to the local router issuing the request message.

In one embodiment, the method further comprises: upon receiving the content request message, the management server determining whether the management server contains the requested content; upon determination that the requested content is not contained in the management server, the management servers transmitting the message to a further local router other than the mapping local router and managed by the same management server.

In one embodiment, the method further comprises: the management server receiving the requested content from the further local router in a response to the content request message; the management server storing the requested content therein; and the management server transmitting the requested content to the mapping local router.

In one embodiment, the method further comprises: upon determination that the requested content is not contained in the further local router, the management server transmitting the request message to another management server adjacent to the management server or a content server providing the requested content.

In still another aspect, there is provided a method for transmitting a content in a content-based network system, the method comprising: upon receiving a content response message, inputting an identifier for a requested content contained in the content response message into a hash function, thereby to compute a hash value for the requested content; identifying a mapping local router which is mapped to the computed has value; and directly transmitting the content response message to the identified mapping local router.

In one embodiment, the system includes a plurality of local groups, wherein each of the local groups includes a plurality of local routers assigned different hash values respectively.

Advantageous Effects

In accordance with the present disclosure, the method for transmitting the content in the content-based network system may have following effects, though the present disclosure is not limited thereto:

First, according to the method for transmitting content according to the present disclosure, the requested content is stored only in the mapping local router mapped to the hash value for the requested content, and thus, various kinds of contents can be distributedly stored in the routers.

Second, according to the method for transmitting content according to the present disclosure, the content request message is directly sent only to the mapping local router mapped to the hash value for the requested content. Thus, the traffic load can be reduced as compared to the case of transmitting the content request message in a flooded manner.

Third, according to the method for transmitting content according to the present disclosure, the content request message is directly sent only to the mapping local router mapped to the hash value for the requested content, thereby to allow more rapid search of the requested content.

Fourth, according to the method for transmitting content according to the present invention, the hash values for the requested content are randomly assigned to the local routers within the set range, whereby various contents are distributed evenly among the plurality of local routers.

DESCRIPTION OF DRAWINGS

FIG. 6 is a diagram for illustrating an example of hash values respectively allocated to routers constituting a local group according to the present disclosure.

BEST MODES

Hereinafter, a method for transmitting content in a content-based network system according to the present disclosure will be described in detail with reference to the accompanying drawings.

Figure 1:
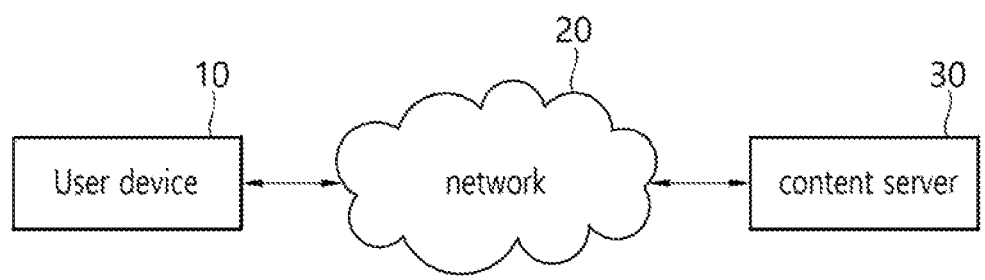
FIG. 1 is a diagram for illustrating a conventional content centric network system.
Figure 2:
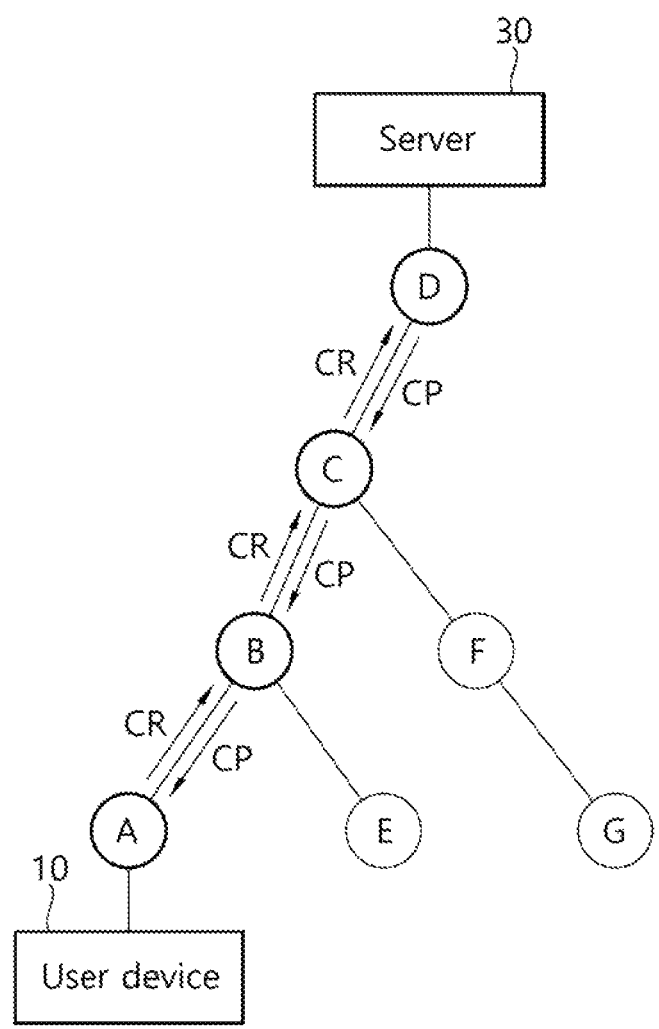
FIG. 2 and FIG. 3 are diagrams for illustrating a process of transmitting and receiving contents in a conventional content centric network system.
Figure 3:
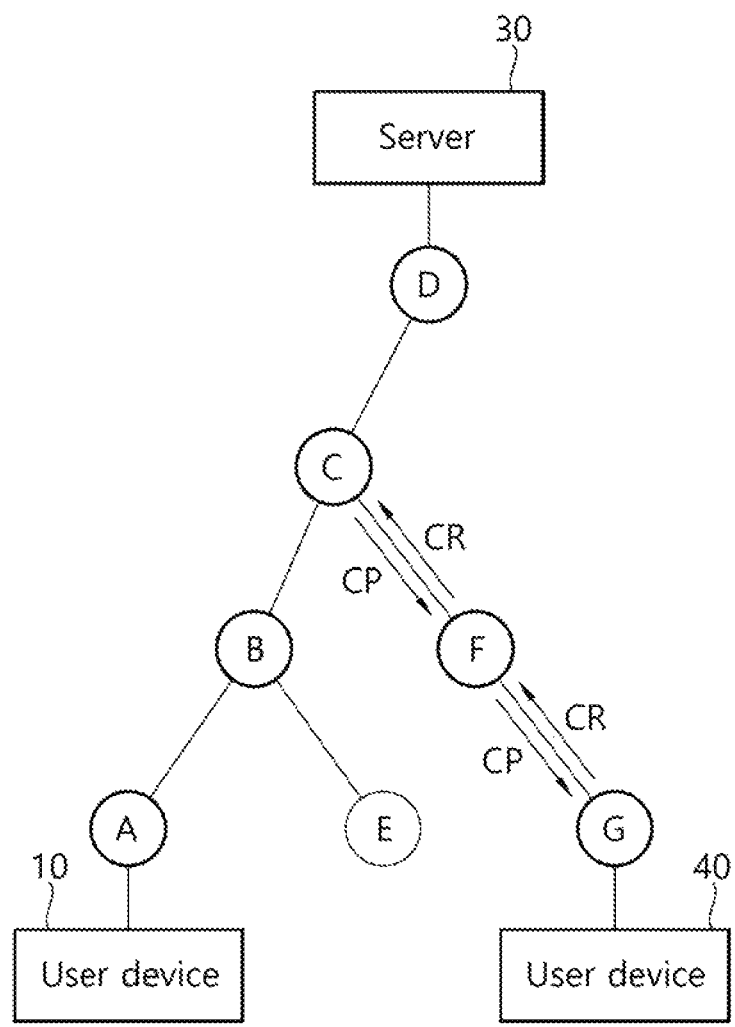
Figure 4:
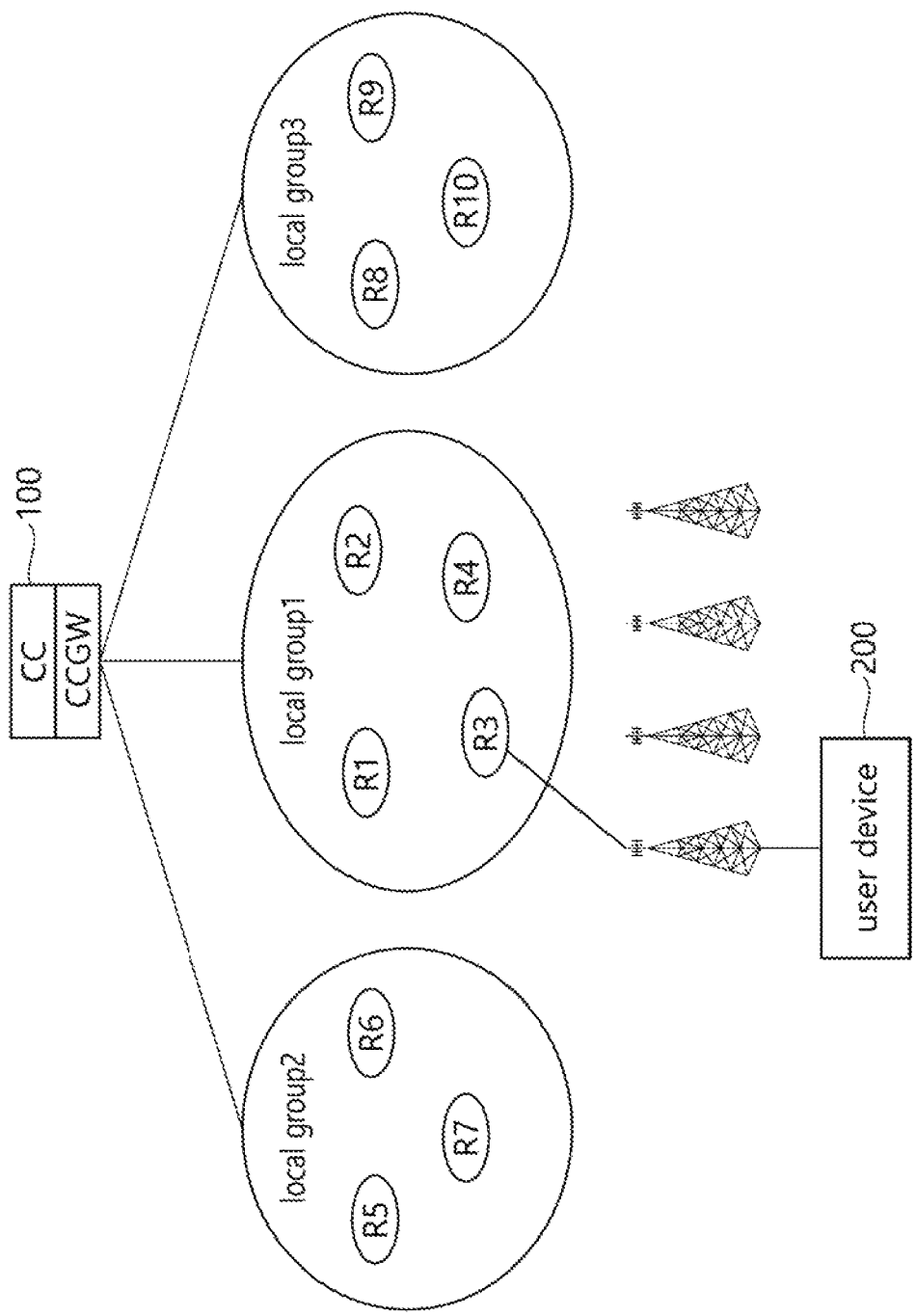
FIG. 4 is a functional block diagram illustrating a content-based network system according to the present disclosure.

FIG. 4 is a functional block diagram describing a content-based network system according to the present disclosure.

Referring to FIG. 4, a management server 100 manages a plurality of local groups (a local group 1, a local group 2, and a local group 3). Each local group has a number of local routers. For example, the local group 1 contains four local routers (R1, R2, R3, and R4). The local group 2 has three local routers (R5, R6, and R7). The local group 3 contains three local routers (R8, R9, and R10). Depending on the applications of the present disclosure, the number of the local groups managed by the management server 100 may vary. Further, depending on the applications of the present disclosure, the number of the local routers making up each local group may also vary.

A user device 200 transmits a content request message requesting specific content to a base station to which the user device 200 has connected. The base station, upon receiving the content request message, first compares a content identifier corresponding to the content request message with a content identifier list registered and stored in the content storage of the base station, to determine whether the requested content exists in the content storage.

When the requested content does not exist in the content storage of the base station, the base station transmits the content request message to a local router, for example, the local router R3 connected to the base station. The local router R3, upon receiving the content request message, determines or identifies a mapped router based on a hash value for the requested content included in the content request message, and directly sends the content request message only to the determined mapped router.

Hereinafter, the local group receiving the content request message is referred to as a mapped local group. The router assigned the hash value for the requested content or mapped or corresponding to the hash value is referred to as a mapping local router. Further, the local group managed by the management server 100 and adjacent to the mapped local group is referred to as an adjacent local group.

When the requested content does not exist in the mapping local router, a virtual content gateway (CCGW) of the management server determines whether or not the requested content exists in the virtual content gateway or in the adjacent local group. When the virtual content gateway has the requested content therein or the CCGW receives the requested content from the adjacent local group, the virtual content gateway stores the requested content in the virtual content gateway. The CCGW then transmits a content response message including the requested content along a routing path of the content request message.

Unlike the conventional content-based network system, according to the present disclosure, the requested content is not stored in all the routers located in the routing path but is stored only in the mapping local router corresponding to the hash value for the requested content.

The local routers included in each local group have different hash values within the set range. Therefore, the local router that has received the content request message selects a local router with a hash value matching the hash value for the requested content as the mapping local router, and then sends the content request message only the selected local router or otherwise stores the requested content only on the selected local router. That is, the content request message is not transmitted to all local routers located in each local group in a flooded manner, but is transmitted directly only to the mapping local router with the hash value corresponding to the hash value for the requested content. In addition, the local routers included in each local group are assigned different contents based on the hash values thereof.

Figure 5:
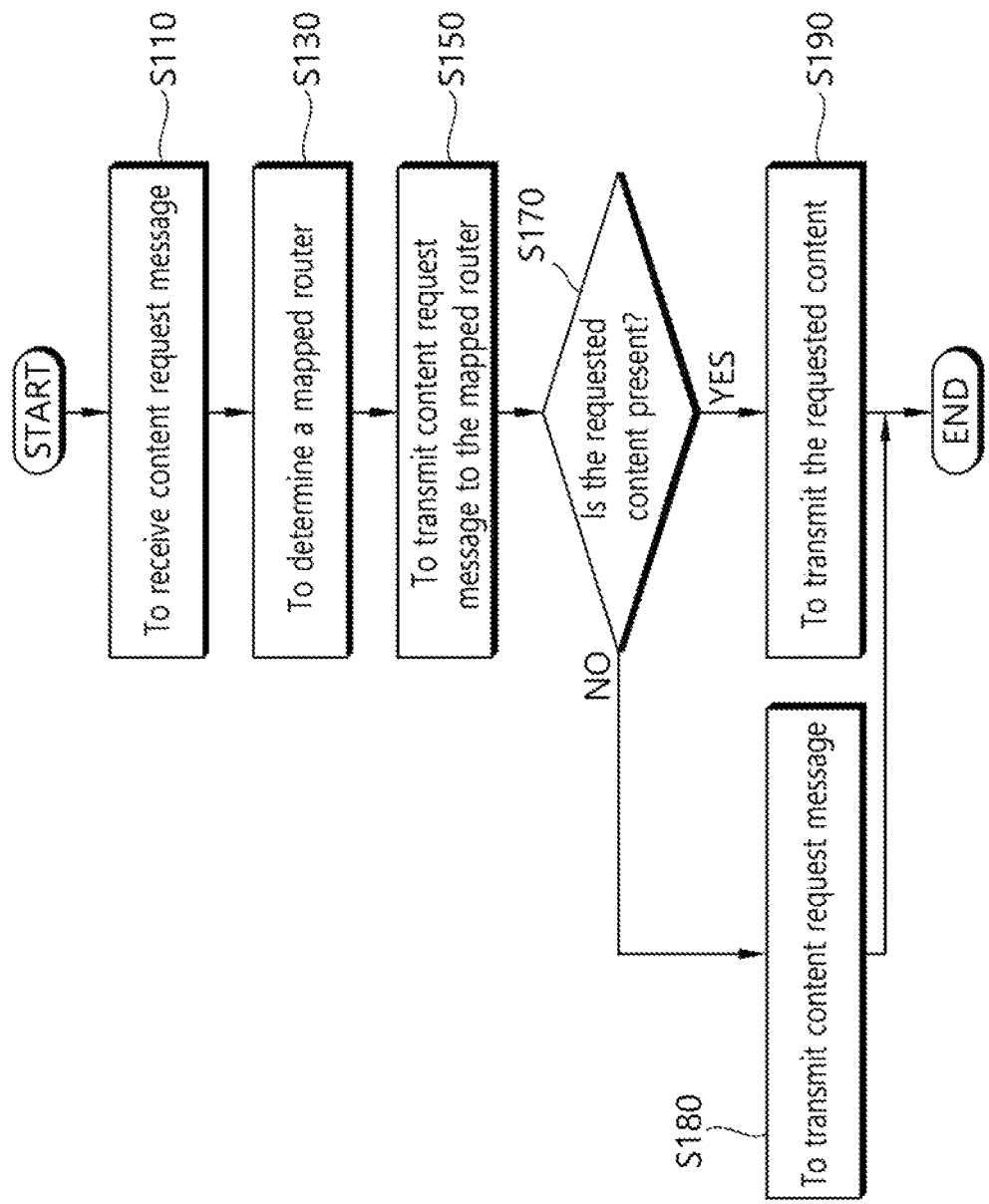
FIG. 5 is a flowchart illustrating a method for transmitting contents in a content-based network system according to the present disclosure.

FIG. 5 is a flow chart for describing a method for transmitting contents of the content-based network system according to the present disclosure.

Referring to FIG. 5, when a local router receives the content request message from the user device through the base station or the base station receives the content request message from the user device S110, the local router or the base station inputs a requested content identifier included in the content request message into the a hash function, thereby calculating a hash value for the requested content. Then, the local router or the base station determines a mapping local router corresponding to the calculated hash value S130. In this regard, the base station also has its own content storage. When the requested content exists in the content storage of the base station, the base station may directly transmit the requested content to the user device.

FIG. 6 illustrates an example of hash values assigned to local routers constituting a local group according to the present disclosure. As shown in FIG. 6, there are four local routers in a local group, such as a local router 1, a local router 2, a local router 3, and a local router 4. The local router 1, the local router 2, the local router 3, and the local router 4 may have different storage capacities. When the set hash values are in a range of 1 to 14, the hash values are randomly assigned to the local routers.

For example, the local router 1 with a storage capacity of 200 GB is assigned hash values 1 and 5. Hash values 2, 7, and 9 are assigned to the local router 2 with a storage capacity of 300 GB. Hash values 3, 6, 10, and 13 are allocated to the local router 3 having a storage capacity of 400 GB, and hash values 4, 8, 11, 12, and 14 are allocated to the local router 4 having the storage capacity of 500 GB. Within the range of the hash values thus set, the hash values are randomly assigned to the local routers, thereby preventing the content from being concentrated on a specific local router. In addition, even when a particular local router is replaced or changed, all the same contents may be prevented from being lost. In addition, the number of the hash values mapped to a local router increases in proportion to the storage capacity of the local router. In this way, the contents are stored into the local routers based on the storage capacities of the local routers.

Referring again to FIG. 5, when a local router receiving the content request message is the mapping local router, the local router directly transmits the requested content to the user device. When the local router receiving the content request message is not the mapping local router, the local router transmits the content request message to the mapping local router to which the hash value for the requested content is allocated S150. Each local router in a local group contains information about a hash value assigned to it and another hash values assigned to other local routers in the same local group.

A more detailed description of the operation S150 is as follows. When the local router receiving the content request message is directly connected to the mapping local router, the local router receiving the content request message directly transmits the content request message only to the mapping local router. However, when the local router receiving the content request message is not directly connected to the mapping local router, the local router receiving the content request message transmits the content request message to the mapping local router via another next local router located in the routing path. That is, when a local router located in the routing path determines that it is not the mapping local router based on the hash value for the requested content, then the other local router merely sends the content request message to a subsequent local router of the routing path.

When the mapping local router receives the content request message, the mapping local router compares an identifier for the requested content with the content ID list registered and stored in its content storage, thereby to determine whether the content is present in the content storage S170. When the requested content is present in the storage of the mapping local router, the mapping local router transmits the requested content in a reverse sequence of a routing flow of the content request message S190.

However, when the requested content does not exist in the mapping local router, the mapping local router transmits the content request message to the management server S180.

Figure 7:
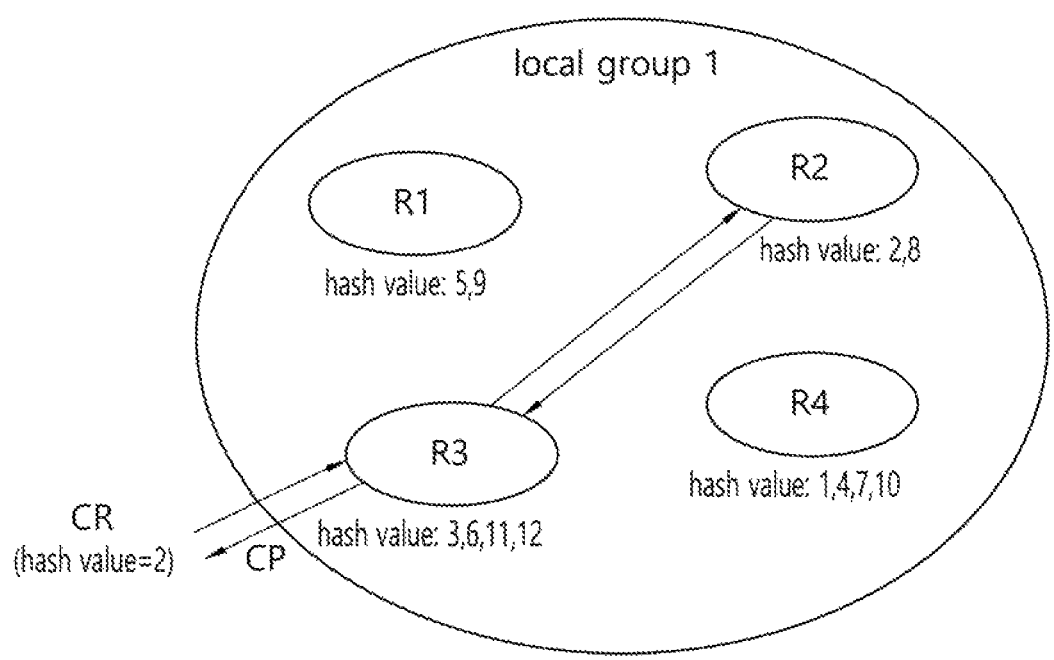
FIG. 7 is a view for illustrating an example of a routing path of a content request message in the mapped local group.

FIG. 7 is a diagram illustrating an example of a routing path of a content request message in a mapped local group. As shown in FIG. 7, when a local router R3 receives a content request message CR from the user device, the local router R3 inputs a requested content identifier for the content request message into a hash function, thereby calculating a hash value 2 for the requested content.

Since the hash values assigned to the local router R3 are 3, 6, 11, and 12, the local router R3 determines that the requested content does not exist in the local router R3. Thus, the local router R3 identifies the mapping local router R2 to which the hash values 2 are assigned. Further, the local router R3 directly transmits the content request message only to the mapping local router R2.

When the requested content exists in the mapping local router R2, the mapping local router R2 transmits a content response message CP in a reverse order of the routing flow. As a result, the requested content is provided to the user device.

Figure 8:
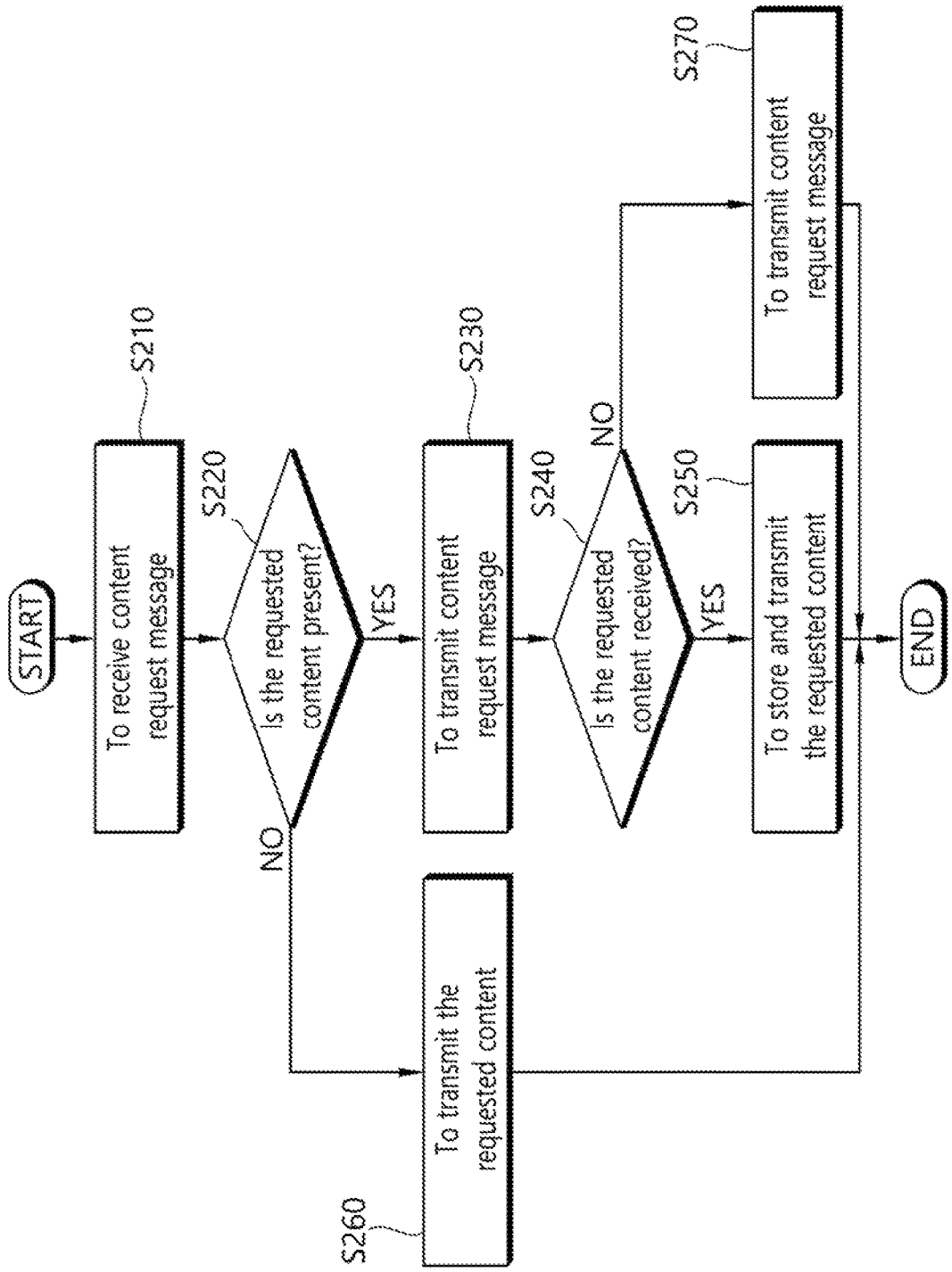
FIG. 8 is a flowchart illustrating a method for transmitting content when a requested content does not exist in a mapped router.

FIG. 8 is a flowchart for describing a method for transmitting contents when the requested content does not exist in the mapping local router.

Referring to FIG. 8, when the requested content does not exist in the mapping local router, the management server receives the content request message from the mapping local router S210. Then, the management server compares an identifier for the requested content with the stored content identifier list in the virtual content gateway thereof, thereby determining whether the requested content is stored in the virtual content gateway S220. When the requested content is stored in the virtual content gateway, the virtual content gateway directly transmits the requested content to the mapping local router S260.

However, when the virtual content gateway does not have the requested content therein, the management server transmits the content request message to an adjacent local group adjacent to the mapped local group and managed by the management server. The management server determines whether the server has received the requested content from the adjacent local group in response to the content request message.

Upon determination that the management server has received the requested content from the adjacent local group, the management server stores the requested content in the virtual content gateway thereof and sends the requested content to the mapping local router. However, when the management server fails to receive the requested content from the adjacent local group (that is, any of the local routers that constitutes the adjacent local group do not include the requested content), the management server transmits the content request message to a neighboring management server adjacent to the current management server or to the content server providing the requested content S270.

Figure 9:
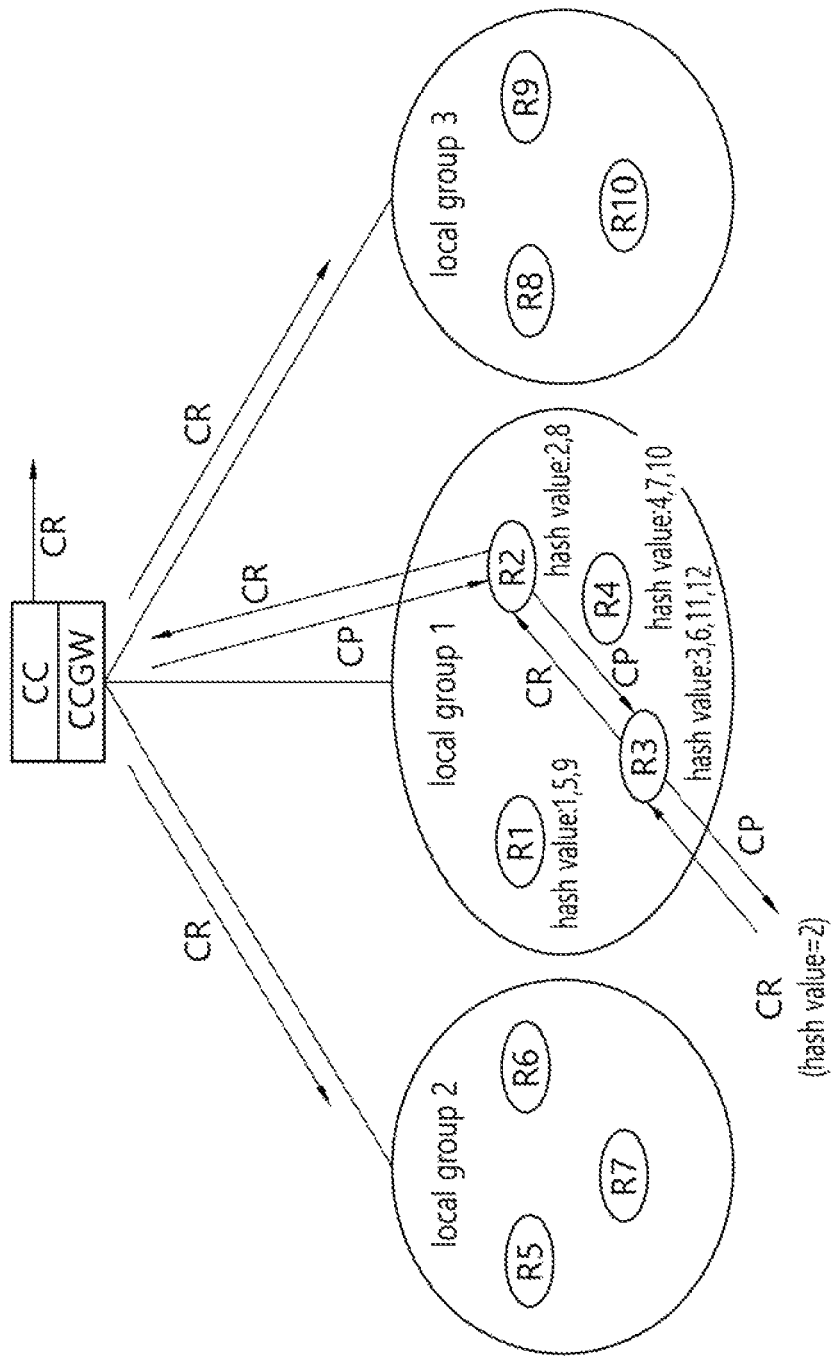
FIG. 9 is a view for illustrating an example of a method for transmitting content when a requested content does not exist in a mapped local group.

FIG. 9 is a diagram for describing an example of a method for transmitting contents when the requested content does not exist in the mapped local group. As shown in FIG. 9, when the requested content does not exist in the mapping local router R2, the mapping local router R2 transmits the content request message to the virtual content gateway (CCGW) of the management server.

The virtual content gateway sends the content request message to the adjacent local group. When the requested content does not exist in the adjacent local group, a virtual controller sends the content request message to an adjacent management server or to the content providing server.

When the management server receives a content response message CP including the requested content from one of the adjacent local group, the neighboring or adjacent management server, or the content providing server, the management server stores the requested content in the virtual content gateway thereof and, at the same time, transmits the requested content to the mapping local router in the reverse order of the routing flow. Then, the mapping local router R2 registers and stores the requested content in its content storage, and transmits the requested content to the user device in the reverse order of the routing path.

Figure 10:
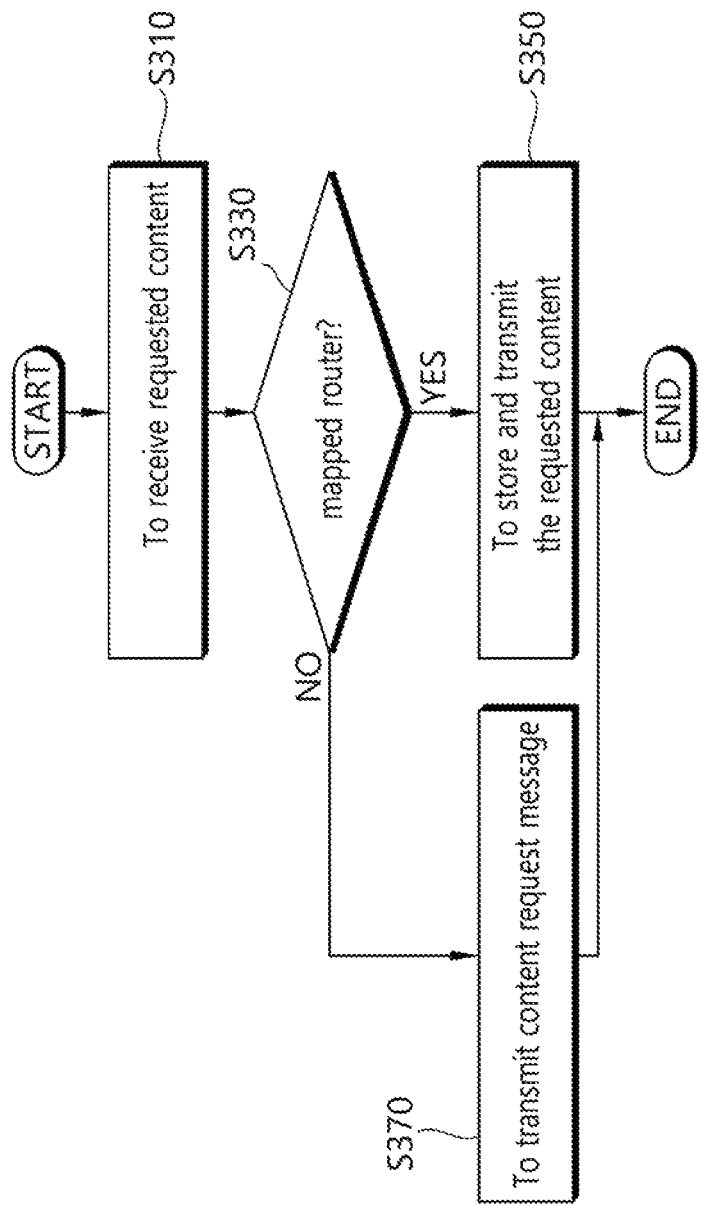
FIG. 10 is a flow chart illustrating a method for storing a requested content.

FIG. 10 is a flow chart for describing a method for storing the requested content.

Referring to FIG. 10, when a local router receives the content response message, the local router, upon receiving the content response message, determine whether it is a mapping local router, based on the hash value for the requested content included in the content response message S330.

When the local router receiving the content response message is the mapping local router, the router stores the requested content therein and transmits the received content response message to a neighboring local router or the user device along the routing path S350. However, when the local router receiving the content response message is not the mapping local router, the content response message is transmitted to a neighboring local router located in the routing path S370. The neighboring local router, upon receiving the content response message, repeats the above-described operations S330 and S370.

Meanwhile, the above-described embodiments of the present disclosure may be embodied as a program that can be executed by a computer. Thus, the embodiments may be implemented by a general-purpose digital computer that executes the program using a computer-readable recording medium.

The computer-readable medium may be any type of computer readable medium including, but not limited to, electrical or magnetic storage media (e.g., ROM, floppy disk, hard disk, etc.), optical readable media (e.g. CD ROM, DVD, etc.), or carrier waves (e.g., transmission over Internet).

Although the present disclosure has been described with reference to the embodiments illustrated in the drawings, these embodiments are merely illustrative. A person skilled in the art may easily derive various modifications and equivalent other embodiments from the above embodiments. Accordingly, the true scope of the present disclosure is defined by the appended claims.

| Reference numerals | |
|---|---|
| 100: the management server | 200: the user device |

The invention claimed is:

1. A content-based network system, wherein the system is configured:

to input an identifier for a requested content into a hash function, thereby to compute a hash value for the requested content;

to store the requested content in a mapping local router which is mapped to the hash value for the requested content;

upon receiving a content request message, to identify the mapping local router;

to determine whether the mapping local router contains the requested content;

upon determination that the mapping local router contains the requested content, to transmit the requested content from the mapping local router to a local router issuing the request message;

upon determination that the mapping local router does not contain the requested content, to transmit the message from the mapping local router to a management server configured to manage the mapping local router;

when the management server contains the requested content, in response to the content request message, to transmit, by the management server, the requested content to another local router managed by the management server;

to determine whether said another local router is mapped to the hash value for the requested content;

upon determination that said another local router is mapped to the hash value, to store the requested content to said another local router; and to transmit the requested content from said another local router to the local router issuing the request message; and to directly transmit the content request message to the identified mapping local router.

2. The system of claim 1, wherein the system includes a plurality of local groups, all groups being managed by the management server, wherein each of the local groups includes a plurality of local routers assigned different hash values respectively.

3. The system of claim 2, wherein the management server includes a virtual controller and a virtual content gateway.

4. The system of claim 3, wherein the system is further configured:

when the mapping local router does not contain the requested content, to determine whether the virtual content gateway contains the requested content; and upon determination that the requested content is not contained in the virtual content gateway, to transmit the content request message to an adjacent local group to the local group including the mapping local router, wherein the adjacent local group is managed by the management server.

5. The system of claim 4, wherein when the virtual content gateway receives the requested content from the adjacent local group in response to the content request message, the management server is configured to store the requested content in the virtual content gateway thereof and to transmit the requested content to the mapping local router.

6. The system of claim 5, wherein when the adjacent local group does not contain the requested content, the virtual controller is configured to transmit the requested content message to another management server adjacent to the management server or to a content server providing the requested content.

7. The system of claim 2, wherein the hash function is configured to compute the hash values within a range set by identifiers for the requested contents, and wherein the different hash values are randomly assigned to the plurality of local routers.

8. The system of claim 7, wherein the number of hash values corresponding to each of the local routers increases in proportion to a storage capacity of each of the local routers.

9. A method for transmitting a content in a content-based network system, the method comprising:
upon receiving a content request message, inputting an identifier for a requested content contained in the content request message into a hash function, thereby to compute a hash value for the requested content;
identifying a mapping local router which is mapped to the computed hash value;
determining whether the mapping local router contains the requested content;
upon determination that the mapping local router contains the requested content, transmitting the requested content from the mapping local router to a local router issuing the request message;
upon determination that the mapping local router does not contain the requested content, transmitting the message from the mapping local router to a management server configured to manage the mapping local router;
when the management server contains the requested content, in response to the content request message, transmitting, by the management server, the requested content to another local router managed by the management server;
determining whether said another local router is mapped to the hash value for the requested content;
upon determination that said another local router is mapped to the hash value, storing the requested content to said another local router;
transmitting the requested content from said another local router to the local router issuing the request message; and
directly transmitting the content request message to the identified mapping local router.

10. The method of claim 9, further comprising:
upon receiving the content request message, determining, by the management server, whether the management server contains the requested content; and
upon determination that the requested content is not contained in the management server, transmitting, by the management server, the message to a further local router other than the mapping local router and managed by the management server.

11. The method of claim 10, further comprising:
receiving, by the management server, the requested content from the further local router in a response to the content request message;
storing, by the management server, the requested content therein; and
transmitting the requested content, by the management server, to the mapping local router.

12. The method of claim 11, further comprising, upon determination that the requested content is not contained in the further local router, transmitting, by the management server, the request message to another management server adjacent to the management server or a content server providing the requested content.

13. A method for transmitting a content in a content-based network system, the method comprising:
upon receiving a content response message, inputting an identifier for a requested content contained in the content response message into a hash function, thereby to compute a hash value for the requested content;
identifying a mapping local router which is mapped to the computed hash value;
determining whether the mapping local router contains the requested content;
upon determination that the mapping local router contains the requested content, transmitting the requested content from the mapping local router to a local router issuing the request message;
upon determination that the mapping local router does not contain the requested content, transmitting the message from the mapping local router to a management server configured to manage the mapping local router;
when the management server contains the requested content, in response to the content request message, transmitting, by the management server, the requested content to another local router managed by the management server;
determining whether said another local router is mapped to the hash value for the requested content;
upon determination that said another local router is mapped to the hash value, storing the requested content to said another local router;
transmitting the requested content from said another local router to the local router issuing the request message; and
directly transmitting the content response message to the identified mapping local router.

14. The method of claim 13, wherein the system includes a plurality of local groups, wherein each of the local groups includes a plurality of local routers assigned different hash values respectively.

15. The method of claim 14, further comprising the hash function computing the hash values within a range set by identifiers for the requested contents, wherein the different hash values are randomly assigned to the plurality of local routers.

16. The method of claim 15, wherein the number of hash values corresponding to each of the local routers increases in proportion to a storage capacity of each of the local routers.

* * * * *